United States Patent
Rose et al.

(10) Patent No.: US 9,921,783 B2
(45) Date of Patent: Mar. 20, 2018

(54) DYNAMICALLY ALLOCATING TEMPORARY REPLACEMENT STORAGE FOR A DRIVE IN A RAID ARRAY

(71) Applicant: Lenovo (Singapore) Pte. Ltd., Singapore (SG)

(72) Inventors: Amy Leigh Rose, Chapel Hill, NC (US); Nathan J. Peterson, Durham, NC (US); Jennifer Lee-Baron, Morrisville, NC (US); John Scott Crowe, Durham, NC (US); James C. Loebach, Raleigh, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 631 days.

(21) Appl. No.: 14/036,589

(22) Filed: Sep. 25, 2013

(65) Prior Publication Data

US 2015/0089130 A1    Mar. 26, 2015

(51) Int. Cl.
G06F 3/06    (2006.01)

(52) U.S. Cl.
CPC .......... G06F 3/0689 (2013.01); G06F 3/0607 (2013.01); G06F 3/0614 (2013.01); G06F 3/0632 (2013.01)

(58) Field of Classification Search
CPC .... G06F 3/0614; G06F 3/0619; G06F 3/0631; G06F 3/0689
See application file for complete search history.

(56) References Cited

U.S. PATENT DOCUMENTS

| | | | | |
|---|---|---|---|---|
| 8,805,918 B1* | 8/2014 | Chandrasekaran | ... | G06F 3/0604 709/200 |
| 2006/0075283 A1* | 4/2006 | Hartung | ............... | G06F 11/1092 714/6.2 |
| 2006/0212747 A1* | 9/2006 | Okamoto | ............ | G06F 11/1092 714/6.12 |
| 2006/0236054 A1* | 10/2006 | Kitamura | ............... | G06F 3/0605 711/165 |
| 2008/0005470 A1* | 1/2008 | Davies | .................. | G06F 3/0617 711/114 |
| 2008/0126849 A1* | 5/2008 | Kotzur | ................ | G06F 11/2094 714/6.32 |
| 2008/0208930 A1* | 8/2008 | Kubo | .................. | G06F 11/2094 |
| 2009/0063768 A1* | 3/2009 | Kalos | .................... | G06F 3/0607 711/114 |

(Continued)

*Primary Examiner* — Hal Schnee
(74) *Attorney, Agent, or Firm* — Ference & Associates LLC

(57) ABSTRACT

One embodiment provides a system, including: one or more processors; a network interface for communication with a remote bank of available storage; a redundant array of independent disks (RAID) operatively coupled to the one or more processors; and a memory operatively coupled to the one or more processors and storing instructions executable by the one or more processors to: ascertain at least one unavailable hard disk drive (HDD) of the RAID; determine an available remote storage target; dynamically update a storage destination for data to be stored from the at least one unavailable HDD of the RAID to the available remote storage target; and send the data over the network interface to the available remote storage target. Other embodiments are described and claimed.

14 Claims, 4 Drawing Sheets

(56) References Cited

U.S. PATENT DOCUMENTS

| | | | |
|---|---|---|---|
| 2009/0265510 A1* | 10/2009 | Walther | G06F 11/1092 711/114 |
| 2010/0229033 A1* | 9/2010 | Maeda | G06F 11/1076 714/6.32 |
| 2013/0047028 A1* | 2/2013 | Daikokuya | G06F 11/0727 714/6.3 |
| 2013/0145064 A1* | 6/2013 | Radovanovic | G06F 13/38 710/113 |
| 2013/0145209 A1* | 6/2013 | Saito | G06F 11/1076 714/6.32 |
| 2013/0346794 A1* | 12/2013 | Bartlett | G06F 11/2094 714/6.21 |
| 2014/0052813 A1* | 2/2014 | Han | H04L 67/1097 709/214 |
| 2014/0244927 A1* | 8/2014 | Goldberg | G06F 3/0689 711/114 |

* cited by examiner

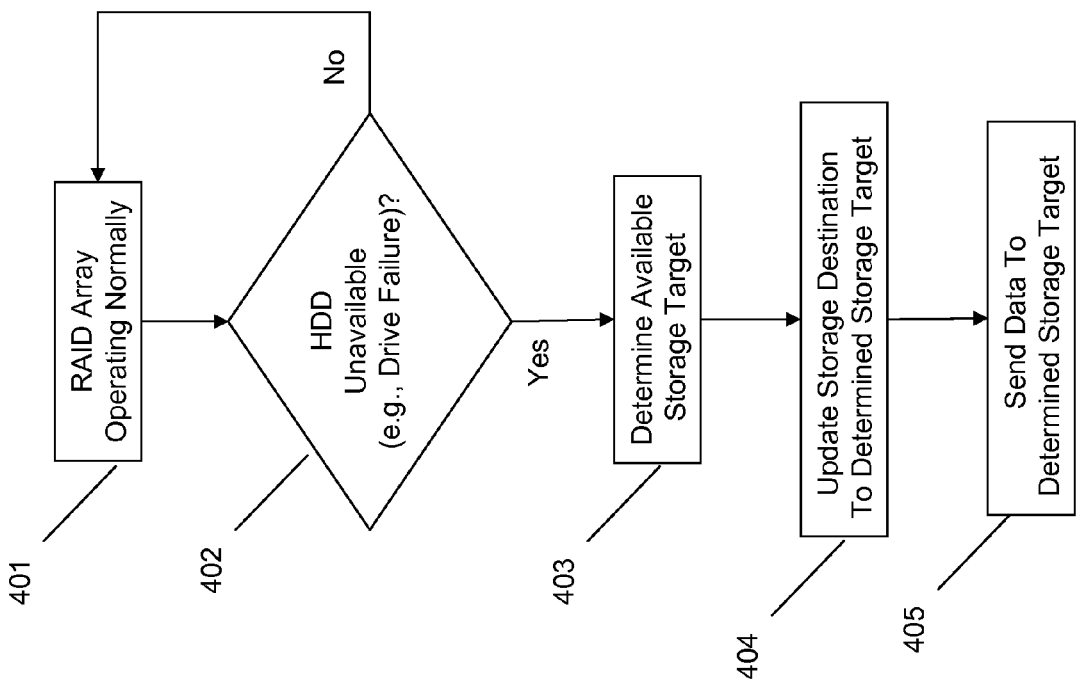

DYNAMICALLY ALLOCATING TEMPORARY REPLACEMENT STORAGE FOR A DRIVE IN A RAID ARRAY

BACKGROUND

The subject matter described herein relates to RAID (Redundant Array of Independent Disks) storage system configurations and management of storage in RAID configurations.

RAID is a technology that employs the simultaneous use of two or more storage locations (e.g., hard disk drives, "HDDs", disks, drives) to achieve greater levels of performance, reliability, and/or larger data volume sizes. The term RAID is now used as an umbrella term for computer data storage schemes that can divide and replicate data among HDDs. Various designs involve the design goals of increased data reliability and increased input/output performance. When several physical disks are set up to use RAID, they are said to be in a RAID array. The RAID array distributes data across several disks, but the user and operating system see the array as one single disk. RAID arrays can be configured in various ways to serve different purposes.

BRIEF SUMMARY

In summary, one aspect provides a system, comprising: one or more processors; a network interface for communication with a remote bank of available storage; a redundant array of independent disks (RAID) operatively coupled to the one or more processors; and a memory operatively coupled to the one or more processors and storing instructions executable by the one or more processors to: ascertain at least one unavailable hard disk drive (HDD) of the RAID; determine an available remote storage target; dynamically update a storage destination for data to be stored from the at least one unavailable HDD of the RAID to the available remote storage target; and send the data over the network interface to the available remote storage target.

Another aspect provides a method, comprising: communicating, using a network interface, with a remote bank of storage; ascertaining, in a redundant array of independent disks (RAID), at least one unavailable hard disk drive (HDD) of the RAID; determining an available remote storage target; dynamically updating a storage destination for data to be stored from the at least one unavailable HDD of the RAID to the available remote storage target; and sending the data over the network interface to the available remote storage target.

Another aspect provides a program product, comprising: a storage device having computer readable program code stored therewith, the computer readable program code comprising: computer readable program code configured to communicate, using a network interface, with a remote bank of storage; computer readable program code configured to ascertain, in a redundant array of independent disks (RAID), at least one unavailable hard disk drive (HDD) of the RAID; computer readable program code configured to determine an available remote storage target; computer readable program code configured to dynamically update a storage destination for data to be stored from the at least one unavailable HDD of the RAID to the available remote storage target; and computer readable program code configured to send the data over the network interface to the available remote storage target.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4 illustrates an example method for dynamically allocating temporary replacement storage for a drive in a RAID array.

DETAILED DESCRIPTION

Figure 1:
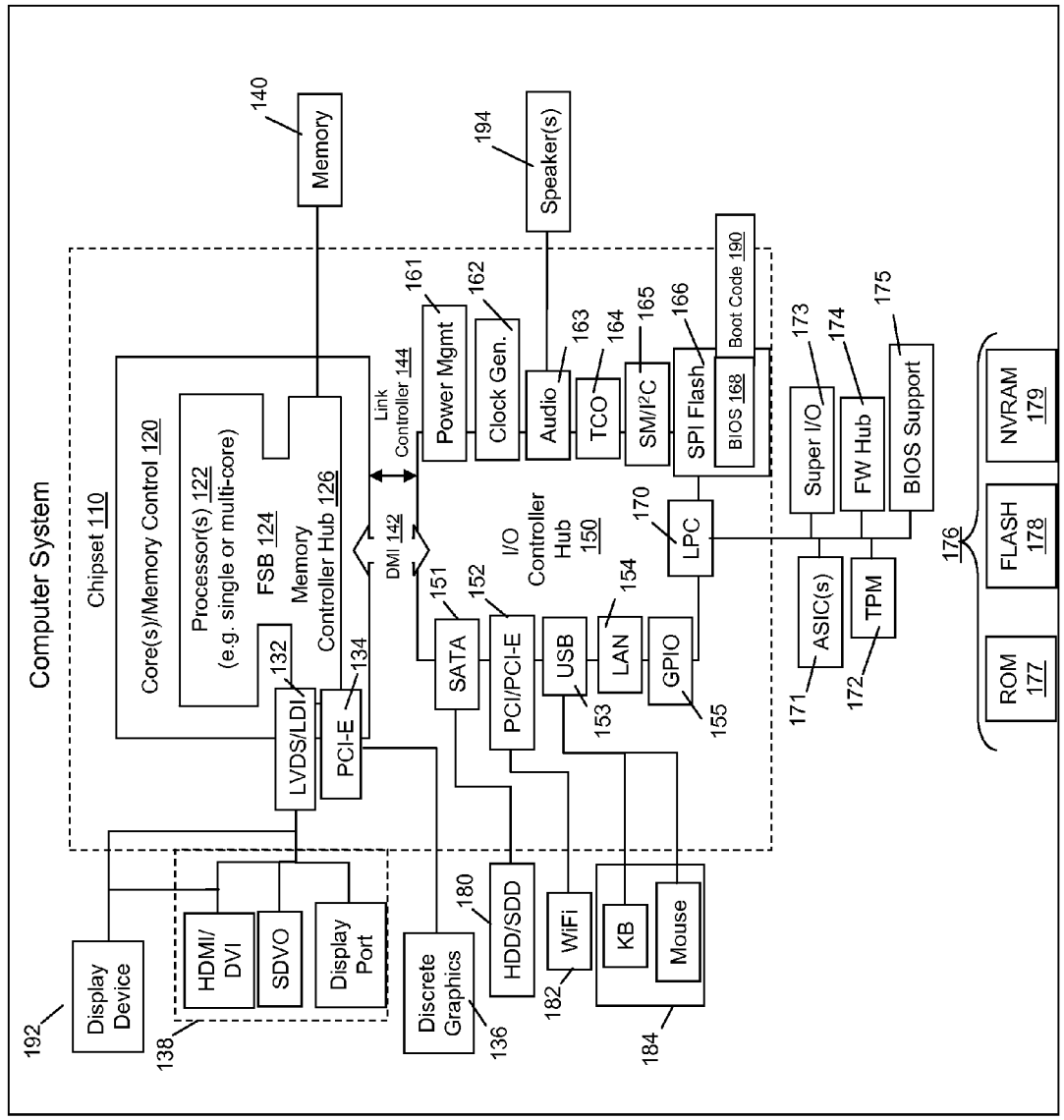
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When an HDD of a RAID array fails or otherwise becomes unavailable, there is no automated way of replacing the failed or unavailable HDD. In such a circumstance, one needs to physically swap hard disks when an HDD failure occurs; otherwise, the server will run with a degraded RAID array. If additional HDDs fail in the degraded state, the system may lose all of its data. While servers can be set up with an on-board "hot spare" HDD (i.e., the physical server contains one or more spare or unused/reserved HDD(s)), the hot spare(s) is/are only good for the individual server. Thus, there is wasted storage capacity in this configuration because there is no ability to dynamically shared hot spares between physical RAID sets on different servers.

Accordingly, an embodiment provides a "bank" of available storage (e.g., spare HDDs) that are connected to the RAID array in question, e.g., via an iSCSI connection. When any HDD has dropped out of the RAID array in question (i.e., becomes unavailable for storage), the bank of available storage may be utilized to dynamically allocate storage space (e.g., on an available HDD of another server/system) to the server suffering the storage deficiency, and rebuilding of the RAID array may begin while data storage continues. This configuration minimizes the degraded system time and helps prevent catastrophic failure. Multiple, un-identical or asymmetric servers with different HDD sizes or vendors may also be employed as available storage. Such dynamic reallocation of available storage may be particularly useful in the context of remote server farms or data centers (e.g., where an administrator is not on site to handle drive failures).

The illustrated example embodiments will be best understood by reference to the figures. The following description is intended only by way of example, and simply illustrates certain example embodiments.

While various other circuits, circuitry or components may be utilized in information handling devices, FIG. 1 depicts a block diagram of an example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
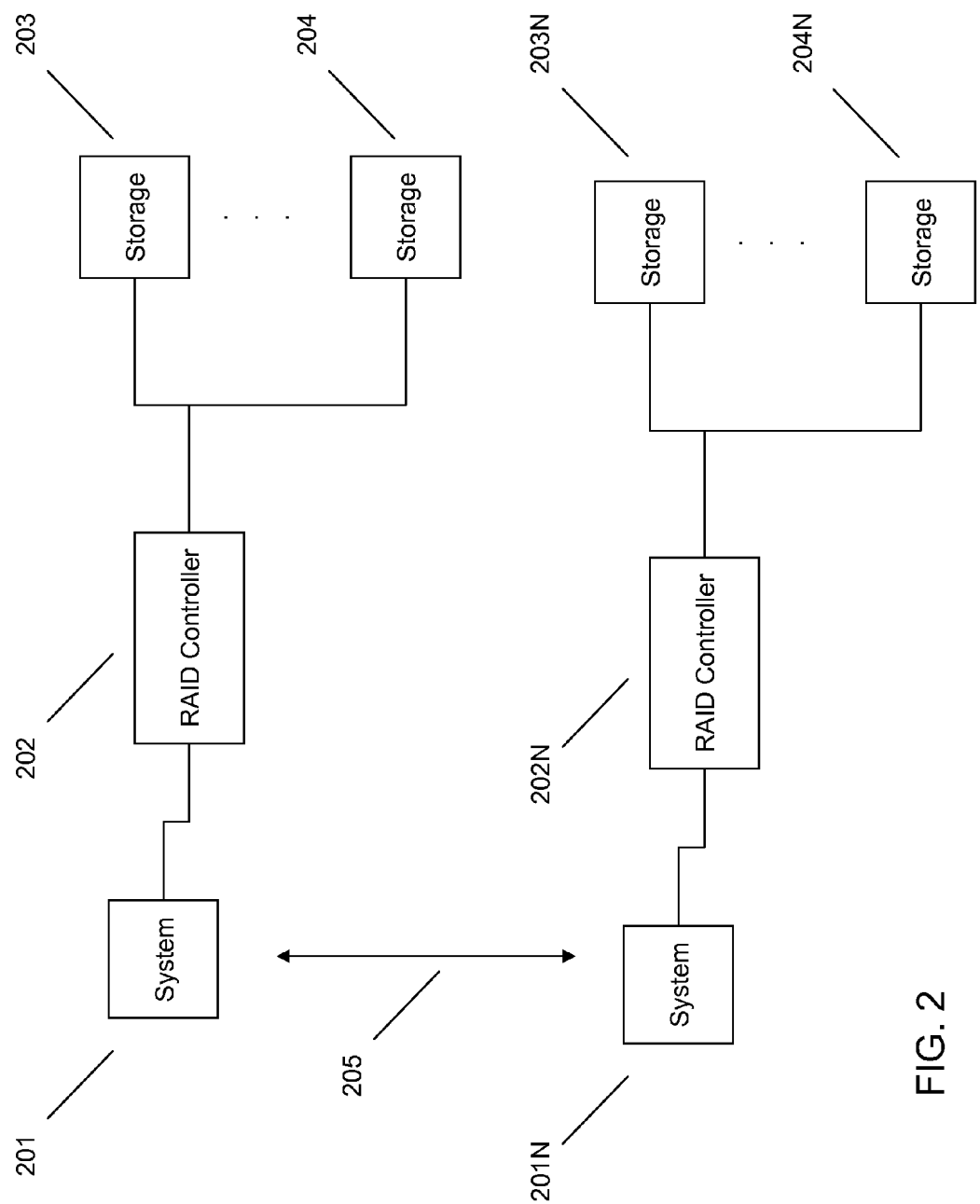
FIG. 2 illustrates an example shared storage environment.

Circuitry such as outlined for example outlined in FIG. 1 may be provided in a system or server 201, 201N, in a RAID array, as outlined in FIG. 2. In such a configuration, each system 201, 201N, stores data redundantly in parallel storage 203, 204, 203N, 204N (e.g., HDDs) according to a conventional RAID array. A RAID controller, e.g., 202, may be integrated into a system, e.g., 201, for example as a card, and is in communication with storage, e.g., 203, 204, forming the physical set, i.e., RAID array. The storage locations, e.g., 203, 204, may be symmetric (e.g., storage 203 may comprise a 4 pack of HDDs, storage 204 may also comprise a 4 pack of HDDs) or asymmetric (e.g., each of storage 203, 204 may have a different number of HDDs). Data is piped to the storage locations as appropriate to save redundant copies of data (e.g., creating backup copies of important data, either temporarily or persistently).

It is worth noting that a RAID array may take a variety of forms and will be further described in connection with the specific but non-limiting example illustrated in the figures utilized herein. For example, other elements, e.g., interposer cards, may be included while not necessarily described in detail or illustrated.

In large data storage environments (e.g., server farm), multiple such systems may be configured. Thus, illustrated in FIG. 2 is another system 201N, which is also configured to store data in a redundant fashion. That is, system 201N includes a RAID controller 202N and storage locations 203N, 204N. These servers/systems 201, 201N, and components thereof, may be the same or may be different, but each is configured as a RAID array for redundant storage.

Illustrated in FIG. 2 is a communication element 205 which may take a variety of forms. The communication element comprises a communication link between systems 201, 201N, or components thereof. For example, communication element 205 permits a bank of HDDs (e.g., a pool of storage available among 203, 204, 203N, 204N, or a separate system providing lump storage similar to 203, 204, 203N, 204N, or some suitable combination thereof) will be accessible to the servers 201, 201N, on-demand. For example, the connected servers 201, 201N, may communicate to remotely available storage by an iSCSI connection.

In the illustrated example of FIG. 2, the connection or communication element 205 takes the form of a system 201 to system 201N communication, where the bank of HDDs is a distributed pool of storage provided by storage locations 203, 204, 203N and 204N. Other configurations are possible, as will become apparent from the following description.

When a system element, e.g., system 201, is alerted that any HDD (e.g., an HDD of storage location 203) has dropped out of its RAID array, e.g., by the server 201 baseboard management controller (BMC) or otherwise, the bank (in this example, storage locations 203N, 204, 204N) will dynamically allocate storage space (e.g., one HDD selected from 203N, 204, 204N) to that server (201). While storage of data continues, rebuilding the RAID array may take place (i.e., replacing the lost HDD).

As may be appreciated from the example of FIG. 2 then, each of (or a portion of) the storage locations 203, 203N, 204, 204N may be thought of as a distributed bank of storage. Non-allocated storage, e.g., an HDD available in one system as a hot spare, may be dynamically reallocated to another system (different server) in such a configuration. As a specific example, if system 201 detects that storage 203 (e.g., an HDD thereof) has become unavailable (e.g., drive failure), system 201 will be appraised of other available storage, even of different physical RAID set(s), e.g., 203N, 204N. Further assuming that storage location 204N contains a spare HDD that is not being utilized, this fact may be communicated among systems 201, 201N such that, on drive failure in storage 203, system 201 may choose an available target from the distributed bank of available storage locations, in this example storage 204N (or location therein, if 204N contains multiple HDDs). Thus, the distributed bank may be considered the sharing of available hot spares between systems 201, 201N.

The communication regarding the distributed bank of storage may take a variety of forms. For example, a system may periodically report its available storage locations that may be dynamically reallocated according to a predetermined policy, e.g., every "x" time period (e.g., where "x" is minutes, hours, etc.), at start up of the system, etc. Moreover, the systems, e.g., 201, 201N, may report directly to one another or via a master node within the system, or a suitable combination of the foregoing.

It will be appreciated that the remote bank of available storage is remote in that a network connection (e.g., between systems 201, 201N) is utilized to move data to a dynamically allocated target. The bank of available storage may take a variety of forms in addition to or in combination with the distributed bank (an example of which has been provided in FIG. 2).

Figure 3:
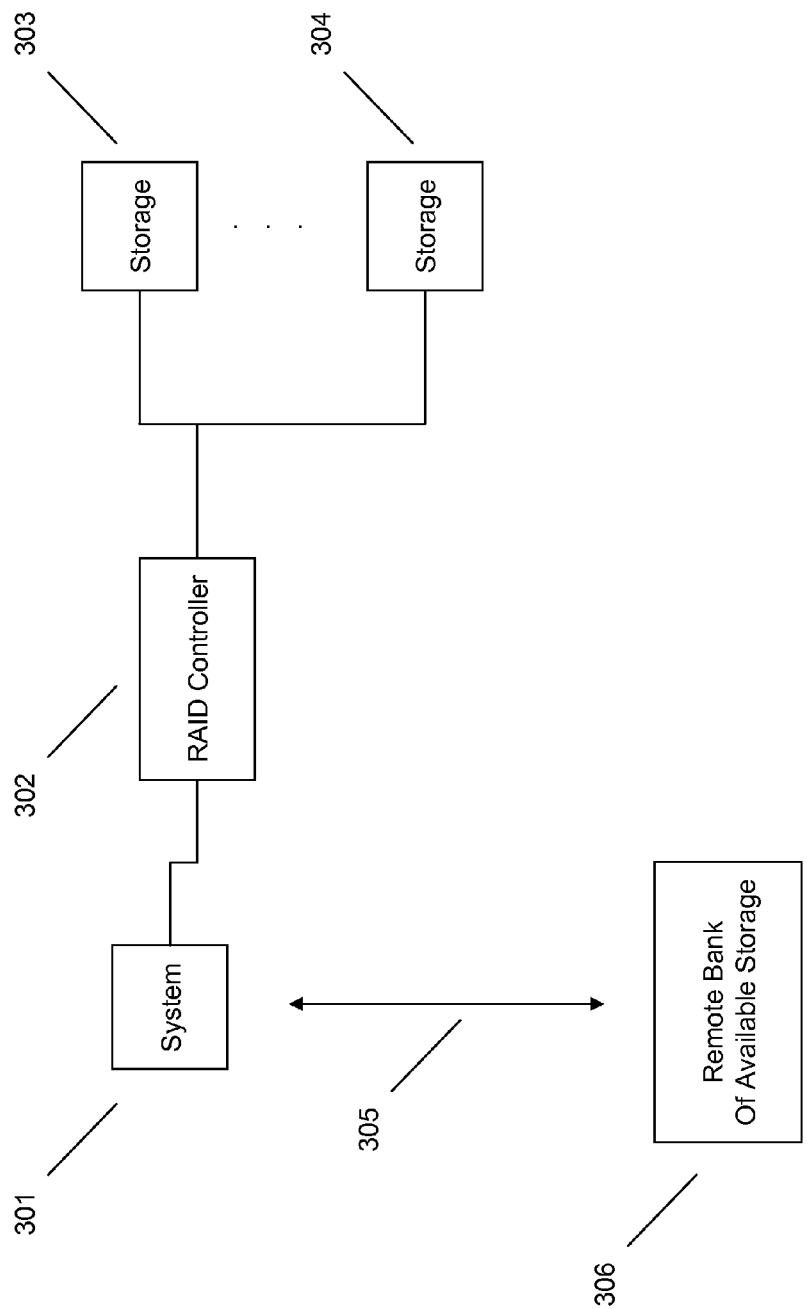
FIG. 3 illustrates another example shared storage environment.

For example, referring to FIG. 3, a dedicated bank of available storage 306 may be provided. Thus, in lieu of or in addition to the various systems, e.g., 201, 201N, keeping track of available storage, each may be in communication with a dedicated bank of available storage 306 that serves to dynamically allocate storage (e.g., HDDs, portions thereof, etc.) to a particular server, e.g., 301. When confronted with disk failure, system 301 simply accesses the remote bank of available storage 306 in an on-demand fashion.

As a specific example, if system 301 encounters a disk failure in storage location 303 and has no available spare HDDs on-board, system 301 may access, e.g., via connection 305, an available HDD of remote bank 306. In this regard, it should be noted that the remote bank 306, as with the distributed bank of available storage (e.g., 203, 204, 203N, 204N) may be logically or physically divided. For example, if a disk of size "x" GB of storage location 303 fails, a similar or same size of disk (x GB) within remote bank 306 may be provisioned. This matches the failed hardware, e.g., in size. Other matching may also be provided (e.g., vendor, etc.) such that a disk of remote bank 306 may be physically swapped with the failed disk of location 303 at a later time for replacement. Thus, remote bank 306 may be just a bunch of disks (JBOD) of a certain size, each of which is available in an on-demand or dynamic fashion to systems, e.g., 301, of the storage environment. The number and/or type of disks stored in the remote bank 306 may be proportionally matched to those being used in the shared storage environment.

As an alternative to, or in addition to, matching, e.g., by size, etc., the bank of available storage 306 may be provided logically. For example, remote bank 306 may be considered as a lump storage of a particular size, e.g., x GB. If a system, e.g., 301, has an HDD of size x GB fail and thus requires replacement storage of a size up to x GB, it may dynamically request the same from remote bank 306 such that continued storage may proceed without the need to restore the failed disk, e.g., within storage 303. This dynamic allocation of lumped storage may be provided in a variety of ways, for example via a system, e.g., 301, requesting an iSCI target of a particular size, with the request directed to, e.g., remote bank 306. Remote bank may therefore respond with an appropriate target allocating the requested storage, which may or may not be mapped to a physical disk. As will be appreciated, logical or lump storage may be provided by a distributed or pooled bank as well.

FIG. 4 gives an overall outline of a method for dynamically allocating temporary replacement storage for a drive in a RAID array. In a normally operating RAID array 401, a system or server will store data redundantly among HDDs of the array. The system will ascertain a drive is unavailable at 402, e.g., a system may determine that a drive in the RAID array has failed. If such a determination is made at 402, the system may determine an available storage target among other servers (e.g., disks distributed among other physical RAID sets and/or a dedicated bank, etc.) at 403. As described herein, there are a number of ways in which this determination may be made.

For example, a system may keep a locally stored list of available storage derived from the remote bank. In such a scenario, each system may communicate to the other systems available storage (e.g., locations, sizes, etc.). These communications may be conducted according to a policy, e.g., at predetermined times, frequencies, and the like. Additionally or alternatively, each system may be in communication with a master or manager node that tracks and updates a list of available storage within the bank (either distributed among other servers or in a dedicated bank, as described herein). Thus, part of determining an available storage target may include transmitting and/or receiving messages from other servers/master node as to which storage locations are available at any given time.

Responsive to determining an available storage target, e.g., available hot spare on another system, available lump storage location, etc., the system in question may update its storage destination to that of the determined available storage target at 404. Therefore, the system will be able to direct (e.g., send over a network connection to another system's available storage) the data destined for the failed drive to the available storage target.

As with determining and maintaining available storage targets, tracking and maintenance of data sent to an available storage target may be managed in a variety of ways. For example, a master node and/or the systems themselves(s) may communicate to ensure the new storage location is available in the event that data stored there is to be retrieved, e.g., accessed, copied back, etc. In some cases (e.g., temporary data storage), the data directed to the new/available storage location may be deleted and/or reallocated at an appropriate time (e.g., when the system in question has been restored, e.g., new HDD installed, data no longer need, etc.). As described herein, in one example, a physical storage location (e.g., HDD) of the bank may be physically removed from the bank (e.g., another system) and placed into the system in question as the replacement HDD, thus avoiding any further data transfer.

Once an unavailable storage location, e.g., a failed bad drive, has been replaced, the storage destination previously allocated may return back to an available state for other systems to use. This may be done either locally via normal RAID rebuilding, or the data could be copied over the network from the remote location.

As will be appreciated from the foregoing, the various embodiments permit for dynamically allocating temporary replacement storage for a drive in a RAID array. Such configurations of RAID systems allows for reduced storage (e.g., fewer hot spares needed), increased flexibility, as well as providing more time (e.g., in the case of remote server farms/data centers) in which to make repairs.

It will be readily understood by those having ordinary skill in the art that the various embodiments or certain features of the various embodiments may be implemented as computer program products in which instructions that are executable by a processor are stored on a computer readable or device medium. Any combination of one or more non-signal device readable medium(s) may be utilized. The non-signal medium may be a storage medium. A storage medium may be any non-signal medium, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN), or the connection may be made through other devices (for example, through the Internet using an Internet Service Provider) or through a hard wire connection, such as over a USB connection.

Aspects are described herein with reference to the figures, which illustrate examples of inputs, methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:
   one or more processors;
   a network interface for communication with a plurality of systems each having a dedicated remote bank of available storage and a redundant array of independent disks (RAID) and each of the dedicated remote bank of available storage comprising at least one non-allocated storage; and
   a memory operatively coupled to the one or more processors and storing instructions executable by the one or more processors to:
   ascertain at least one unavailable hard disk drive (HDD) of one of the RAIDs;
   determine an available remote storage target from the non-allocated storage of the plurality of systems and hard disk drives of the RAID of the plurality of systems based upon receipt of periodic updates of available remote storage targets, wherein at least one of the available remote storage targets comprises a HDD of a system other than the system of the at least one unavailable HDD;
   wherein to determine an available remote storage target comprises identifying at least one of the storage of a substantially similar size as the unavailable hard disk drive and designating the at least one substantially similar size storage as an available remote storage target;
   dynamically update a storage destination for data to be stored from the at least one unavailable HDD of the RAID to the available remote storage target; and
   send the data over the network interface to the available remote storage target.

2. The system of claim 1, wherein the network interface sends the data to an available remote storage target selected from the dedicated remote bank of available storage comprising a lump storage allocated logically upon request.

3. The system of claim 1, wherein the network interface further communicates control data, wherein the control data identifies an available remote storage target from among a plurality of HDDs of differing size.

4. The system of claim 1, wherein to ascertain at least one HDD of the RAID is unavailable comprises determining that the at least one HDD of the RAID has failed.

5. The system of claim 1, wherein the instructions are further executable by the one or more processors to receive a message regarding available remote storage space to be allocated as an available remote storage target.

6. The system of claim 5, wherein the instructions are further executable by the one or more processors to update a list of available remote storage targets based on the message regarding available remote storage space.

7. The system of claim 1, wherein the instructions are further executable by the one or more processors to transmit a message regarding available storage space of the system to be allocated as an available remote storage target.

8. A method, comprising:
communicating, using a network interface, with a plurality of systems each having a dedicated remote bank of available storage and a redundant array of independent disks (RAID) and each of the dedicated remote bank of available storage comprising at least one non-allocated storage;
ascertaining at least one unavailable hard disk drive (HDD) of one of the RAIDs;
determining an available remote storage target from the non-allocated storage of the plurality of systems and hard disk drives of the RAID of the plurality of systems based upon receipt of periodic updates of available remote storage targets, wherein at least one of the available remote storage targets comprises a HDD of a system other than the system of the at least one unavailable HDD;
wherein the determining an available remote storage target comprises identifying at least one of the storage of a substantially similar size as the unavailable hard disk drive and designating the at least one substantially similar size storage as an available remote storage target;
dynamically updating a storage destination for data to be stored from the at least one unavailable HDD of the RAID to the available remote storage target; and
sending the data over the network interface to the available remote storage target.

9. The method of claim 8, wherein the network interface sends the data to an available remote storage target selected from the dedicated remote bank of available storage comprising a lump storage allocated logically upon request.

10. The method of claim 8, the wherein network interface further communicates control data, wherein the control data identifies an available remote storage target from among a plurality of HDDs of differing size.

11. The method of claim 8, further comprising receiving a message regarding available remote storage space to be allocated as an available remote storage target.

12. The method of claim 11, further comprising updating a list of available remote storage targets based on the message regarding available remote storage space.

13. The method of claim 8, further comprising transmitting a message regarding available storage space of the system to be allocated as an available remote storage target.

14. A program product, comprising:
a storage device having computer readable program code stored therewith, the computer readable program code being executable by a processor and comprising:
computer readable program code that communicates, using a network interface, with a plurality of systems each having a dedicated remote bank of available storage and a redundant array of independent disks (RAID) and each of the dedicated remote bank of available storage comprising at least one non-allocated storage;
computer readable program code that ascertains at least one unavailable hard disk drive (HDD) of one of the RAIDs;
computer readable program code that determines an available remote storage target from the non-allocated storage of the plurality of systems and hard disk drives of the RAID of the plurality of systems based upon receipt of periodic updates of available remote storage targets, wherein at least one of the available remote storage targets comprises a HDD of a system other than the system of the at least one unavailable HDD
wherein the computer readable program code that determines an available remote storage target comprising computer readable program code that identifies at least one of the storage of a substantially similar size as the unavailable hard disk drive and designates the at least one substantially similar size storage as an available remote storage target;
computer readable program code that dynamically updates a storage destination for data to be stored from the at least one unavailable HDD of the RAID to the available remote storage target; and
computer readable program code that sends the data over the network interface to the available remote storage target.

* * * * *